US006836253B2

(12) United States Patent
Strache et al.

(10) Patent No.: US 6,836,253 B2
(45) Date of Patent: Dec. 28, 2004

(54) TRANSMITTING AND/OR RECEIVING UNIT FOR INCORPORATION INTO AN ELASTIC STRUCTURE

(75) Inventors: Wolfgang Strache, Hannover (DE); Holger Behrends, Hannover (DE); Thomas Becherer, Burgwedel (DE); Jörg Lehmann, Hannover (DE); George J. Rutter, Matthews, NC (US)

(73) Assignee: Continental Aktiengesellschaft, Hannover (DE)

( * ) Notice: Subject to any disclaimer, the term of this patent is extended or adjusted under 35 U.S.C. 154(b) by 41 days.

(21) Appl. No.: 10/290,170

(22) Filed: Nov. 8, 2002

(65) Prior Publication Data

US 2003/0085619 A1 May 8, 2003

(30) Foreign Application Priority Data

Nov. 8, 2001 (DE) .......................................... 101 54 494

(51) Int. Cl.$^7$ .............................. H01Q 1/32; H01Q 9/16
(52) U.S. Cl. ....................... 343/713; 343/806; 343/795; 343/895
(58) Field of Search ................................ 343/713, 895, 343/795, 897, 793, 711, 788, 866, 806; H01Q 9/16, 1/32

(56) References Cited

U.S. PATENT DOCUMENTS

| 4,938,015 | A | * | 7/1990 | Kinoshita | ..................... | 57/200 |
| 5,706,018 | A | * | 1/1998 | Yankielun | ..................... | 343/823 |
| 5,843,583 | A | * | 12/1998 | D'Haene et al. | ............. | 428/592 |
| 5,847,683 | A | * | 12/1998 | Wolfe et al. | ................. | 343/866 |
| 6,630,910 | B2 | * | 10/2003 | Forster et al. | ............... | 343/806 |
| 6,677,907 | B2 | * | 1/2004 | Shoji et al. | .................. | 343/702 |

FOREIGN PATENT DOCUMENTS

WO          WO 99 29523          6/1999 ........... B60C/23/04

* cited by examiner

*Primary Examiner*—Don Wong
*Assistant Examiner*—Trinh Vo Dinh
(74) *Attorney, Agent, or Firm*—Walter Ottesen

(57) ABSTRACT

The invention is directed to a transmitting and/or receiving unit for building into an elastic structure. The transmitting and receiving unit includes one or more electronic circuits or circuit elements and, if needed, sensors and/or signal elements assigned thereto. The transmitting and/or receiving unit has one or several antennas connected to the electronic circuit. The antenna includes one or several filaments which are so arranged in the surface or in space that the main directions of the stresses and forces, which occur within the surrounding elastic structure/matrix, essentially intersect or cross the filament axes.

22 Claims, 2 Drawing Sheets

TRANSMITTING AND/OR RECEIVING UNIT FOR INCORPORATION INTO AN ELASTIC STRUCTURE

FIELD OF THE INVENTION

The invention relates to a transmitting and/or receiving apparatus for incorporation into an elastic structure including a transponder which is built into a tire. The elastic structure is preferably a polymer structure. The transmitting and/or receiving apparatus is made of one or several electronic circuit loops or electronic circuit elements assembled, for example, in a microchip. If required, the transmitting and receiving apparatus can be assembled together with sensors and/or signal elements. The transmitting and/or receiving apparatus has one or several antennas connected to the electronic circuit loops.

The invention also relates to an antenna for such a transmitting and receiving apparatus.

BACKGROUND OF THE INVENTION

Transmitting and/or receiving apparatus of the above kind (for example, transponders) comprise, as a rule, one or several electronic components as well as antennas connected to the electronic components. The electronic components can be in the form of a chip, if required, with integrated sensor elements.

In some cases, the entire transmitting and/or receiving apparatus can be embedded in a plastic foil so that a flexible thin strip is formed wherein the electronic component and antenna are surrounded by foil.

The introduction of the transmitting and receiving apparatus into elastic structures such as polymer structures, for example, vehicle pneumatic tires made of rubber, is difficult. Such transponder units can, for example, be embedded in rubber pillows surrounding the same and can be attached as a patch with adhesive to the interior or exterior side of a finished tire, that is, a tire which is completely vulcanized. The application with adhesive is itself not easy because the tire must be cleaned and roughened. Also, the application with adhesive leaves something to be desired with reference to its durability (speed, deformation of the tire during operation). The antenna can be destroyed or can be torn from the electronic circuit or component with deformations of the tire.

The incorporation by vulcanization of such transmitting and/or receiving apparatus (transponder units) into the tires is likewise associated with disadvantages. The disadvantage here is that the antenna can be destroyed or torn from the electronic circuit or component during the shaping of the tire which is associated with the manufacture thereof and the corresponding intense deformations of the workpiece blank.

It also happens that the mechanical loading of the transponder unit is too great and that, for example, the antennas tear off after manufacture of the tire because of the direct incorporation of the transponder unit into the rubber matrix in the subsequent deformations of the tire during operation.

SUMMARY OF THE INVENTION

In view of the above, it is an object of the invention to provide a transmitting and/or receiving unit which can be reliably introduced into a tire (10) and which need not necessarily be attached with adhesive as a patch and with which the destruction or a tearing of the antenna because of mechanical loading introduced by the deformations of the tire during manufacture or operation is avoided.

The transmitting/receiving unit of the invention is for mounting in an elastic structure wherein stresses and forces develop and act in main directions when the elastic structure is subjected to load. The transmitting/receiving unit includes: an electronic circuit; at least one antenna connected to the electronic circuit; the antenna including at least one elastically or plastically deformable filament defining a filament axis and surrounded by the elastic structure; and, the filament being disposed in a plane or in space so that the main directions intersect or cross the filament axis.

In addition, antennas are disclosed herein which are suitable in a special manner for use in the transmitting and/or receiving unit of the invention.

The antenna is made of one or several elastically and/or plastically deformable filaments which are so arranged in the surface or in space that the main directions (B) of the stresses and forces, which occur within the structure/matrix surrounding the antennas, essentially intersect or cross the filament axes (A). More specifically, the stresses and forces are therefore not parallel or identical to the filament axes. In the simplest case, the filaments are placed in turns, loops, arcs, spirals (8) or helices.

Such antenna configurations are insensitive to changing bending stresses such as occur for transponders mounted in tires.

Advantageously, the antenna comprises either a plurality of elastically or plastically deformable filaments which are woven and/or braided. The individual filament threads are movable or displaceable relative to each other or the individual filament threads are twisted or rotated with each other and are elastically or plastically deformable. The individual filament threads are likewise configured so as to be movable and/or displaceable relative to each other.

The advantage of such a configuration is that the antennas can be changed without difficulty up to 50% with respect to their dimensions, for example, in the longitudinal direction in that the individual very thin filaments of the braiding so built up bend elastically or plastically and can be displaced relative to each other by changing the braiding geometry, length and slope.

On the other hand, it can be avoided with the weaving and/or braiding of the filaments that an individual filament penetrates too deeply into the surrounding matrix and affects the characteristics of the tire.

An advantageous and simple configuration especially with respect to manufacture comprises making the antenna from a helically-wound filament.

A further advantageous embodiment comprises that the filaments are electrically conductively connected to each other, preferably, via mechanical slide contact (7). In this way, the same radiating/receiving characteristic is provided which would be available in a non-expandable flat antenna. The foregoing is still further improved when the filaments are configured of a metallic material in a further advantageous embodiment of the invention. The material can preferably comprise thin wires or foils.

The apparatus remains operational even though individual filaments could become defective over the service life of the tire.

A further advantageous embodiment provides that the filaments be made of brass or be provided with an external brass layer. Such an embodiment increases the adhesion of the filaments to the surrounding matrix and thereby facilitates, for example, the reliable incorporation of transponders with antennas into tires.

A further advantageous embodiment comprises that the filaments are made of a conductive material such as thin wires or foils made of materials containing carbon. In such an embodiment, it is possible to use an antenna material which either is as similar as possible to the surrounding matrix material or is even the same as this matrix material and only doped, for example, with carbon. In this way, antenna materials and surrounding materials have similar or like moduli of elasticity and are therefore very insensitive relative to mechanical loads which operate thereon.

A further advantageous embodiment comprises that the transmitting and/or receiving apparatus has one or several antennas connected to the electronic circuit with these antennas being connected to each other or to the electronic circuit via a tension relief. With such tension reliefs, for example, by a mechanically tight bridge (9), the tear off of the antenna from the electronic circuit can be prevented.

An antenna form which is suitable in an especially advantageous manner for use in the transmitting and/or receiving apparatus of the invention results in that the antenna is configured in the form of a flat band which comprises filaments braided and/or woven with each other. Such an antenna band provides for a very substantial deformability especially in the longitudinal direction which can amount to up to 50% of the original length.

In a similar manner, advantageous suitable antenna forms result in that the antenna is formed either as a hose (11) wherein the walls of the hose (12) comprise filaments woven and/or braided with each other or, the antenna is configured in the form of a reinforcement filament for tires.

The antenna according to the invention can be configured as a dipole or as a peripheral band whose ends are connected to the electronic circuit and thereby form a closed ring (see FIG. 7). A peripherally extending band is less limited with reference to the receiving direction and can improve the signal at strength especially when its length amounts to half or a quarter of the wavelength of the transmitting frequency. In addition, the possibility is excluded that the antenna ends can penetrate into the material of the tire and cause damage when the tire is subjected to intense loading.

An arrangement of the invention can be embedded between the carcass and the side wall of the tire as well as between the inner portion and the carcass.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
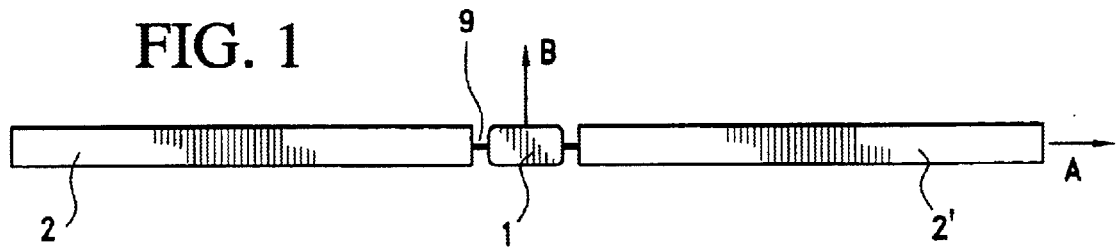
FIG. 1 is a schematic of a first embodiment of the transmitting and/or receiving unit of the invention.

FIG. 1 shows an electronic circuit 1 configured as a microchip. Two strip-shaped antennas (2, 2') are shown connected to the electronic circuit 1. The antennas (2, 2') are configured in the form of flat bands. The electronic circuit 1 together with the antennas (2, 2') conjointly defines a transmitting and receiving unit configured as a transponder in a tire.

Figure 2:
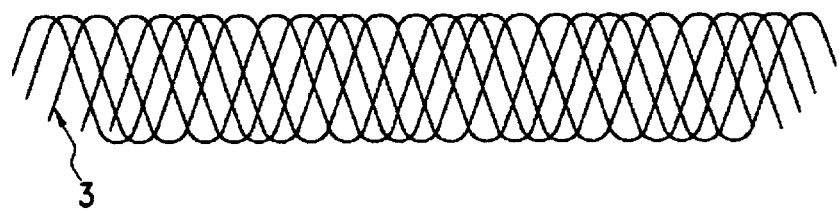
FIG. 2 is an enlarged view of an antenna of the embodiment of FIG. 1.

FIG. 2 shows the individual filaments 3 of the antenna which are displaceable and movable relative to each other and are braided with each other.

Figure 3:
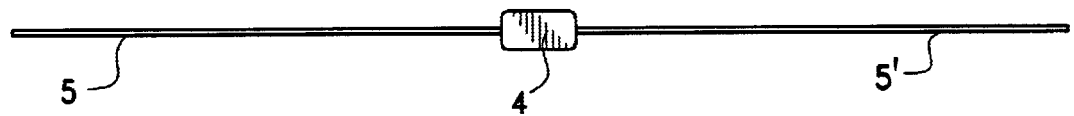
FIG. 3 is a schematic of another embodiment of the transmitting and/or receiving unit of the invention.

FIG. 3 shows an electronic circuit 4 configured as a microchip to which two strip-shaped antennas (5, 5') are connected. The antennas (5, 5') are configured in the form of a reinforcement filament for tires. The electronic circuit 4 and the antennas (5, 5') conjointly define a transmitting and receiving unit configured as a transponder in a tire.

Figure 4:
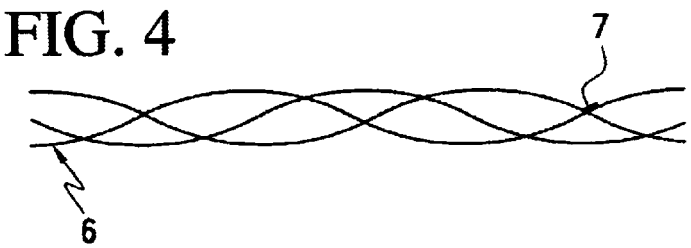
FIG. 4 is an enlarged view of the antenna of the embodiment shown in FIG. 3.
Figure 7:
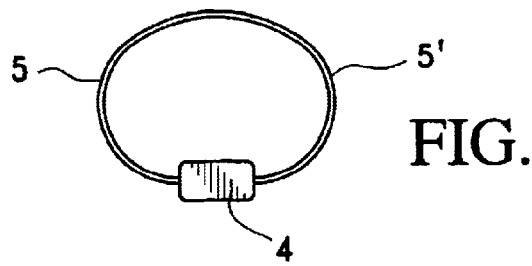
FIG. 7 is a schematic view of another embodiment of the transmitting and/or receiving unit of the inventions.
Figure 5:
FIG. 5 is a schematic view of another embodiment of the transmitting and/or receiving unit of the invention.
Figure 6:
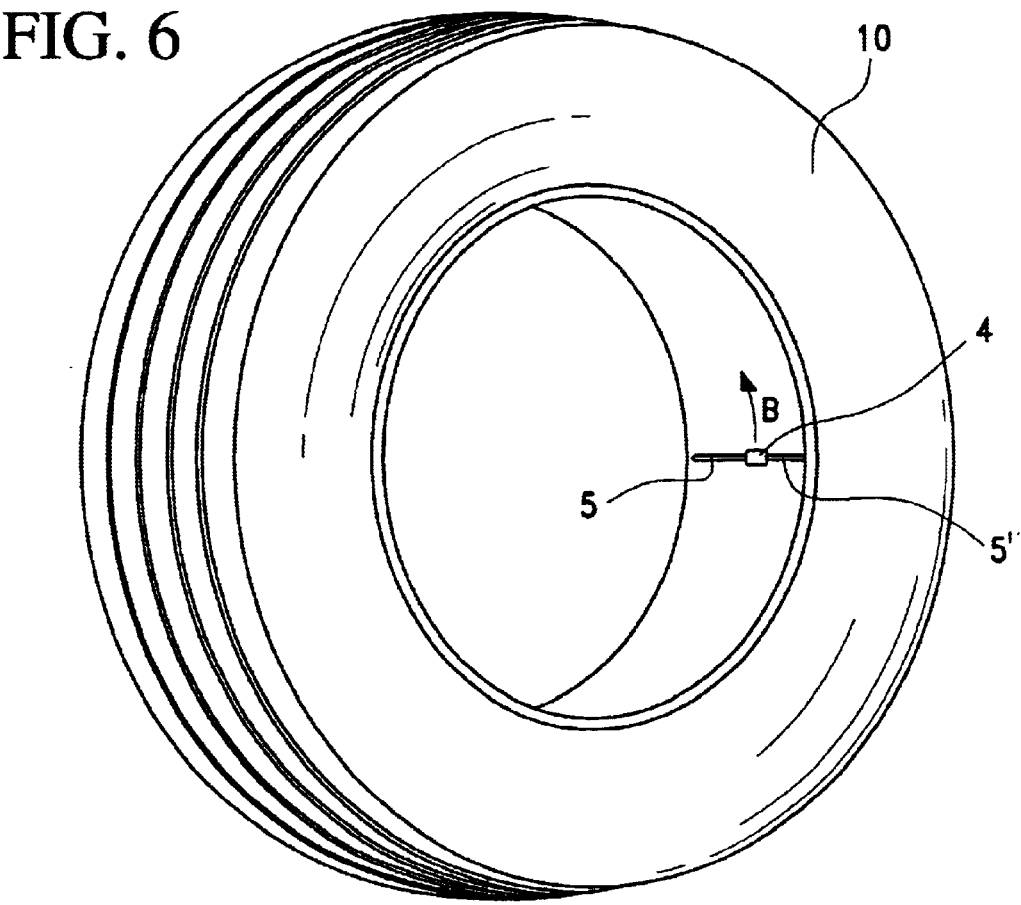
FIG. 6 is a schematic view of an embodiment of the invention mounted in a tire.
Figure 8:
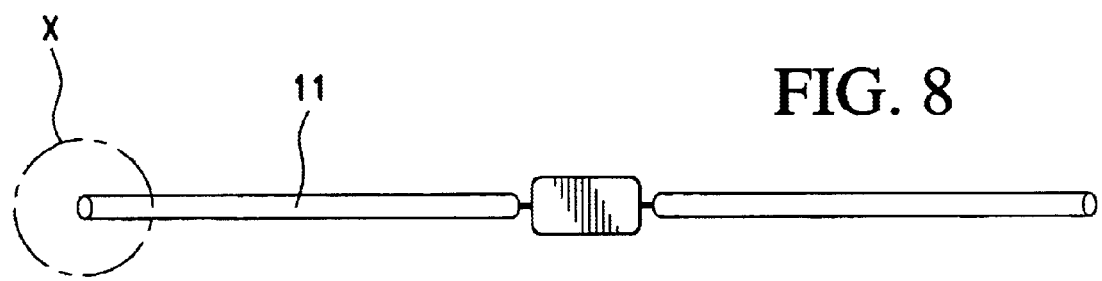
FIG. 8 is a schematic view of yet another embodiment of the transmitting and/or receiving unit of the invention; and, FIG. 8A is an exploded view of detail X of the embodiment shown in FIG. 8.
Figure 8A:
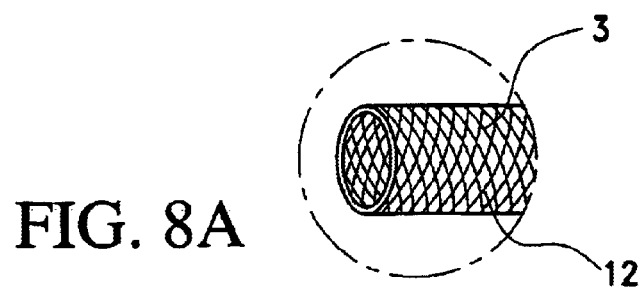

FIG. 4 shows an enlarged section of the antenna 5. FIG. 4 shows the individual filaments 6 which are configured as being twisted with each other and movable and displaceable with respect to each other.

It is understood that the foregoing description is that of the preferred embodiments of the invention and that various changes and modifications may be made thereto without departing from the spirit and scope of the invention as defined in the appended claims.

What is claimed is:

1. A transmitting/receiving unit for mounting in an elastic structure wherein stresses and forces develop and act in main directions when said elastic structure is subjected to load, said transmitting/receiving unit comprising:

an electronic circuit;

at least one antenna connected to said electronic circuit;

said antenna including at least one elastically or plastically deformable filament defining a filament axis and surrounded by said elastic structure; and, said filament being disposed in a plane or in space so that said main directions intersect or cross said filament axis.

2. The transmitting/receiving unit of claim 1, wherein said elastic structure is a tire and said transmitting/receiving unit is a transponder.

3. The transmitting/receiving unit of claim 2, wherein said antenna comprises a plurality of said elastically or plastically deformable filaments; and, said filaments are woven or braided with each other and the individual ones of said filaments are configured to be movable or displaceable relative to each other.

4. The transmitting/receiving unit of claim 3, wherein said plurality of elastically or plastically deformable filaments are electrically connected to each other.

5. The transmitting/receiving unit of claim 4, wherein said filaments are electrically connected to each other by a mechanical slide contact.

6. The transmitting/receiving unit of claim 2, wherein said antenna comprises a plurality of said filaments twisted with each other so as to be displaceable relative to each other.

7. The transmitting/receiving unit of claim 2, wherein said filament is configured to have a spiral shape.

8. The transmitting/receiving unit of claim 2, wherein said antenna comprises a plurality of said electrically or plastically deformable filaments made of a metal material.

9. The transmitting/receiving unit of claim 8, wherein said filaments are configured as thin wires or foils.

10. The transmitting/receiving unit of claim 8, wherein said metal is brass.

11. The transmitting/receiving unit of claim 8, wherein said filaments made of a metal material are accepted with brass.

12. The transmitting/receiving unit of claim 2, wherein said antenna comprises a plurality of said elastically or plastically deformable filaments with said filaments being made of conducting material.

13. The transmitting/receiving unit of claim 12, wherein said filaments are configured as thin wires or foils and said material contains carbon.

14. The transmitting/receiving unit of claim 2, wherein said antenna is connected to said electronic circuit via a tension relief.

15. The transmitting/receiving unit of claim 2, further comprising a plurality of said antennas connected to each other or to said electronic circuit via a tension relief.

16. The transmitting/receiving unit of claim 2, wherein said antenna is in the form of a closed ring having ends connected to said electronic circuit.

17. The transmitting/receiving unit of claim 2, wherein said antenna is formed as a flat band and includes a plurality of said filaments woven or braided with each other.

18. The transmitting/receiving unit of claim 2, wherein said antenna is formed as a hose having a wall and said antenna includes a plurality of said filaments woven or braided to define said wall.

19. The transmitting/receiving unit of claim 2, wherein said antenna is configured as a reinforcement cord of said tire.

20. The transmitting/receiving unit of claim 1, wherein said antenna is insensitive to changing bending stresses.

21. A transponder for mounting in a tire having an elastic structure wherein stresses and forces develop and act in main directions when said tire is subjected to load, said transponder comprising:

an electronic circuit;

at least one antenna connected to said electronic circuit;

said antenna including elastically or plastically deformable filaments each defining a filament axis and surrounded by said elastic structure of said tire; and, said filaments being disposed in a plane or in a space so that said main directions intersect or cross said filament axes.

22. A transmitting/receiving unit for mounting in an elastic structure wherein stresses and forces develop and act in main directions when said elastic structure is subjected to load, said transmitting/receiving unit comprising:

an electronic circuit;

at least one antenna connected to said electronic circuit;

said antenna including at least one plastically deformable filament defining a filament axis and surrounded by said elastic structure; and, said filament being disposed in a plane or in space so that said main directions intersect or cross said filament axis.

* * * * *

UNITED STATES PATENT AND TRADEMARK OFFICE
CERTIFICATE OF CORRECTION

PATENT NO. : 6,836,253 B2
DATED : December 28, 2004
INVENTOR(S) : Wolfgang Strache et al.

It is certified that error appears in the above-identified patent and that said Letters Patent is hereby corrected as shown below:

Column 3,
Line 63, delete "inventions" and substitute -- invention -- therefor.

Column 5,
Line 4, delete "accepted" and substitute -- coated -- therefor.

Signed and Sealed this

Tenth Day of May, 2005

JON W. DUDAS
*Director of the United States Patent and Trademark Office*